United States Patent [19]

Mason

[11] Patent Number: 4,577,413

[45] Date of Patent: Mar. 25, 1986

[54] AUTOMOTIVE WHEEL ALIGNMENT GAUGE APPARATUS

[76] Inventor: James H. Mason, 786 Pittwater Road, Brookvale, New South Wales, 2100, Australia

[21] Appl. No.: 660,456

[22] Filed: Oct. 12, 1984

[30] Foreign Application Priority Data

Oct. 14, 1983 [AU] Australia ............... PG18477
Dec. 20, 1983 [AU] Australia ............... PG2919
May 20, 1984 [AU] Australia ............... PG5087

[51] Int. Cl.$^4$ ............................................. G01B 5/255
[52] U.S. Cl. ............................. 33/203.18; 33/203.16; 33/180 AT
[58] Field of Search ............... 33/203.18, 203, 203.16, 33/203.19, 180 AT, 181 AT, 193, 203.2, 203.17, 203.12

[56] References Cited

U.S. PATENT DOCUMENTS 2,845,718 8/1958 Keymer .................................. 33/193
3,566,476 3/1971 McWhorter ...................... 33/203.12
4,159,574 7/1979 Samuelsson et al. ............. 33/203.18

FOREIGN PATENT DOCUMENTS 504756 5/1939 United Kingdom ............. 33/203.17

*Primary Examiner*—Willis Little
*Attorney, Agent, or Firm*—Marshall & Melhorn

[57] ABSTRACT

The present invention relates to a device for assisting in the alignment of the rear wheels of a front wheel drive vehicle. More specifically the device is used to measure the angular displacement between a horizontal datum perpendicular to the desired forward direction of the vehicle and a horizontal line perpendicular to the axis of rotation of the rear wheel.

9 Claims, 22 Drawing Figures

AUTOMOTIVE WHEEL ALIGNMENT GAUGE APPARATUS

BACKGROUND OF THE INVENTION

The present invention relates to apparatus for assisting in the alignment of automotive components, in particular to alignment of wheels. The need for such alignment frequently occurs as a result of accident damage.

The invention is particularly relevant to front wheel drive automobiles such as those which employ a MacPherson strut suspension system and it will be described hereinafter with reference to this field of use. It will be appreciated, however, that the invention is not limited to this particular application.

Difficulties are encountered in working on front wheel drive automobiles and other vehicles having independent rear wheel suspension. In particular, problems are encountered in establishing the correct alignment of the rear wheel assembly since each wheel is independently adjusted. It is presently very difficult to check whether the rear wheels have their correct degree of toe-in and also that they are correctly in-track with the body. For example, they may be correctly aligned with respect to each other but their axes of symmetry may not be parallel with that of the chassis.

It is an object of the present invention to provide a piece of equipment which will assist in dealing with this problem.

SUMMARY OF THE INVENTION

The present invention consists of an automotive gauge apparatus for rear wheel alignment comprising;

an elongate datum bar, attachment means for engaging said datum bar to the underneath of a vehicle, and horizontally positioning said datum bar perpendicular to the desired direction of forward motion of said vehicle, a wheel conforming means to describe a horizontal line perpendicular to the axis of rotation of a rear wheel, and measuring means to measure the angular displacement between said elongate datum bar and said wheel conforming means.

BRIEF DESCRIPTION OF THE DRAWINGS

Preferred embodiments of the invention will now be descibed, by way of example only, with reference to the accompanying drawings in which.

DESCRIPTION OF THE PREFERRED EMBODIMENTS

Figure 1:
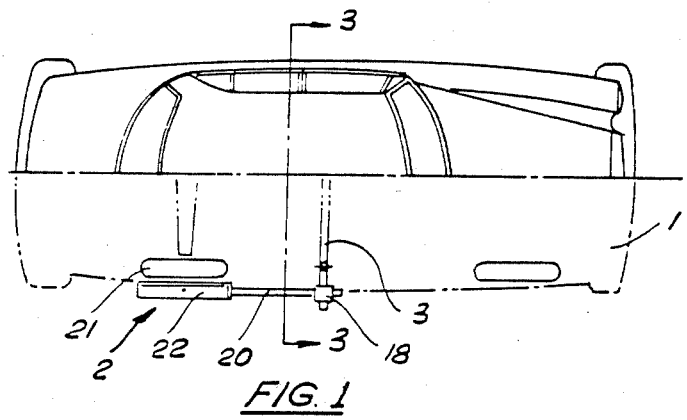
FIG. 1 is a schematic plan view of an alignment gauge apparatus according to the invention illustrated with reference to a vehicle.
Figure 2:
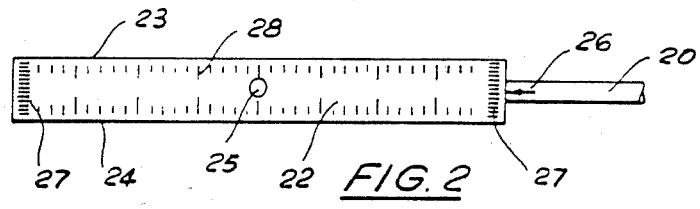
FIG. 2 is an enlarged view of part of the alignment gauge illustrated in FIG. 1.
Figure 3:
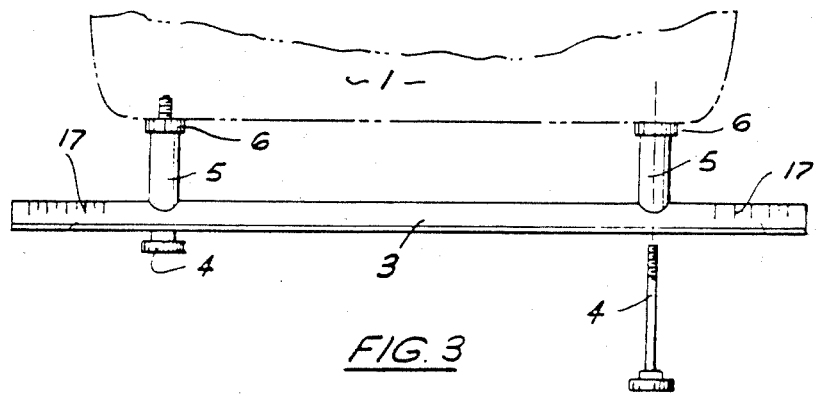
FIG. 3 is an enlarged view taken on line 3—3 of FIG. 1.
Figure 4:
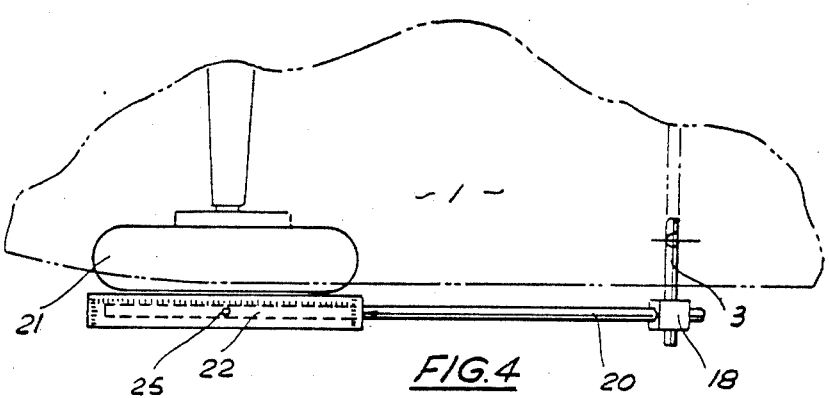
FIG. 4 is an enlarged view of part of FIG. 1.
Figure 5:
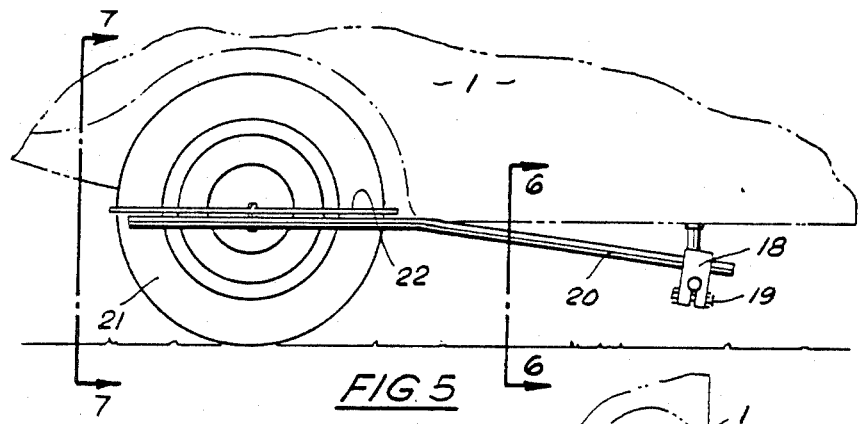
FIG. 5 is an enlarged side elevation of the apparatus shown in FIG. 4.
Figure 6:
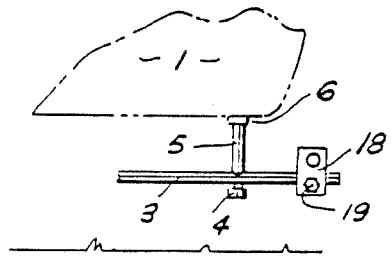
FIG. 6 is a view taken on line 6—6 of FIG. 5.
Figure 7:
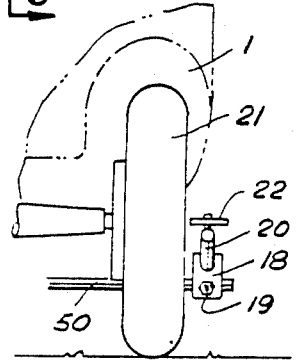
FIG. 7 is a view taken on line 7—7 of FIG. 5.

Referring to the drawings, FIG. 1 illustrates a vehicle 1 fitted with a rear wheel alignment gauge apparatus 2 according to the invention. The gauge apparatus includes a datum bar 3 which is temporarily secured to the underside of the vehicle by screws 4, spacers 5 and locking nuts 6. The screws may engage specially provided jig points on the vehicle frame or they may be secured to any convenient part of the frame. The bar may also be provided with a plurality of spaced vertical holes for selectively locating the screws and spacers.

Figures 8, 9:
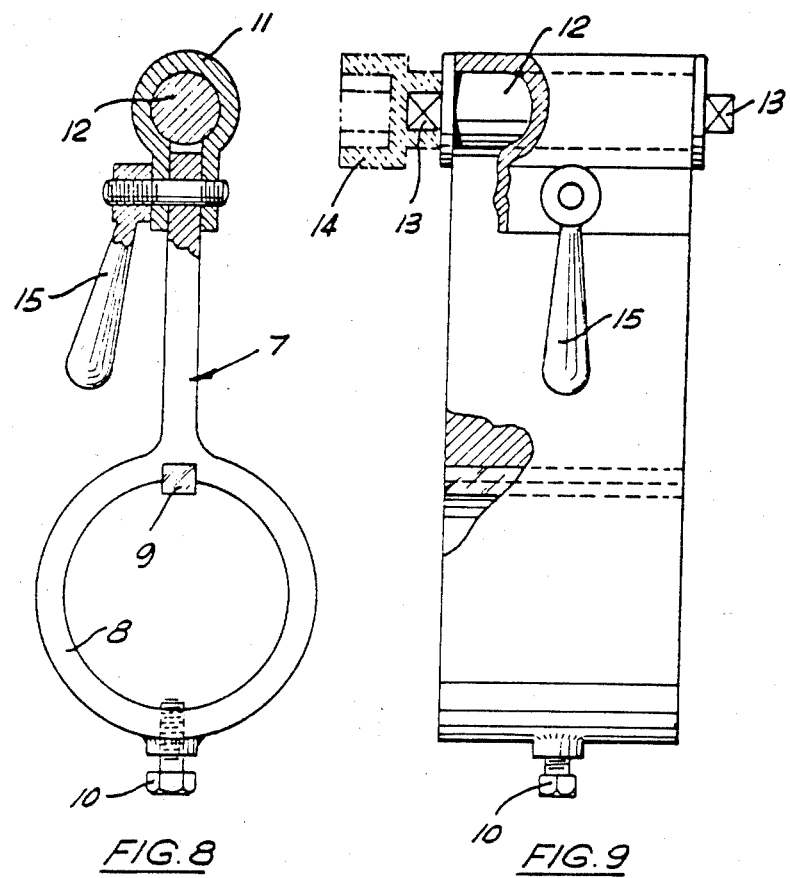
FIG. 8 is an enlarged, partly sectioned side elevation of a banjo hanger for attaching the apparatus to a vehicle.
FIG. 9 is a partly sectioned front elevation of the hanger shown in FIG. 8.
Figure 10:
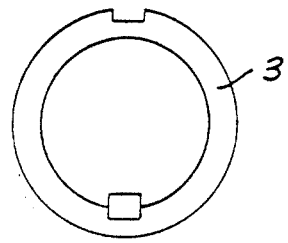
FIG. 10 is a side elevation of a hollow transverse bar for use with the banjo hanger of FIGS. 8 and 9.
Figures 11, 11A:
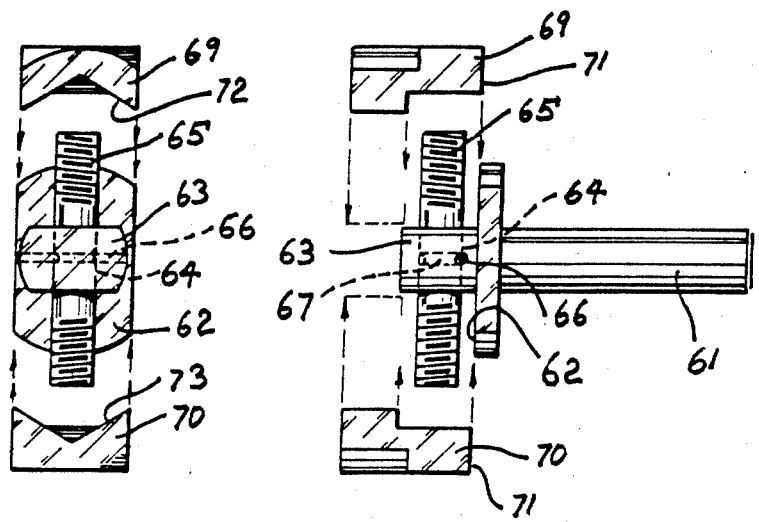
FIG. 11 is a perspective view of a gripping attachment engagable with the banjo hanger of FIGS. 7 and 8.
FIG. 11A is an exploded end view of the gripping attachment shown in FIG. 11.
Figure 12:
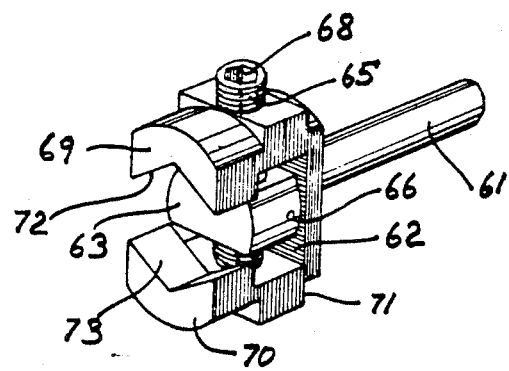
FIG. 12 is an exploded side view of the gripping attachment shown in FIG. 11.

A particularly preferred form, attachment is provided by a pair of banjo hangers 7, one of which is illustrated in FIGS. 8 and 9. Each hanger 7 includes a banjo portion 8 provided with a key 9 for accepting and rotationally locking a correspondingly shaped bar 3. The two hangers 7 are transversally slidable along the bar 3 and are each secured in their required position by a locking screw 10.

The top of each hanger includes a yoke 11 which rotatably supports a captive spool 12 having a socket locating lug 13 at each of its opposite ends. Each of the lugs 13 is engageable with a conventional socket 14 which can be applied to either end of the spool, but oppositely directed to the socket on the other hanger. The two hangers can then be moved along the transverse bar 3 and the spool rotated until the single socket on each hanger engages one of a pair of any conveniently located oppositely directed bolt heads or nuts on the vehicle frame. These bolt heads are usually available on front or rear suspension points on opposite sides of the frame. The locking screws 10 are then tightened to fix the hangers to the bar and the sockets and spools are similarly secured by locking nuts 15. The hangers can extend vertically downwards or at any desired angle depending on the position of the fixing bolt heads or nuts on the vehicle frame.

A gripping device including a body 61 selectively engagable within yoke 11, as an alternative to spool 12 and locating lug 13, includes a keying surface 62 and an upstanding boss 63 having a bore 64 parallel to the keying surface. Mounted within the bore is a clamping screw 65, the opposite ends of which are threaded with reverse bias, that is to say, one end is threaded in a right hand sense and the other is threaded in a left hand sense. The clamping screw is captively located for rotation within the boss by way of a pin 66 which engages a circumferential slot 67 in the clamping screw. One end of the clamping screw includes an Allen socket 68 or other suitable formation for accepting a driving tool.

Located on the clamping screw is a pair of opposing clamping jaws 69 and 70 respectively tapped with left and right hand threads for threaded engagement with respective opposite ends of the clamping screws such that clamping engagement with a projection is achieved upon rotation of the clamping screw. Each jaw includes a sliding surface 71 which interacts with the keying surface to prevent rotation of the jaws about the clamping screw. Each jaw includes multi-faceted engagement surfaces 72 and 73 arranged perpendicularly to the keying surface for positive attachment to a hexagonal fastener.

Figures 13, 14:
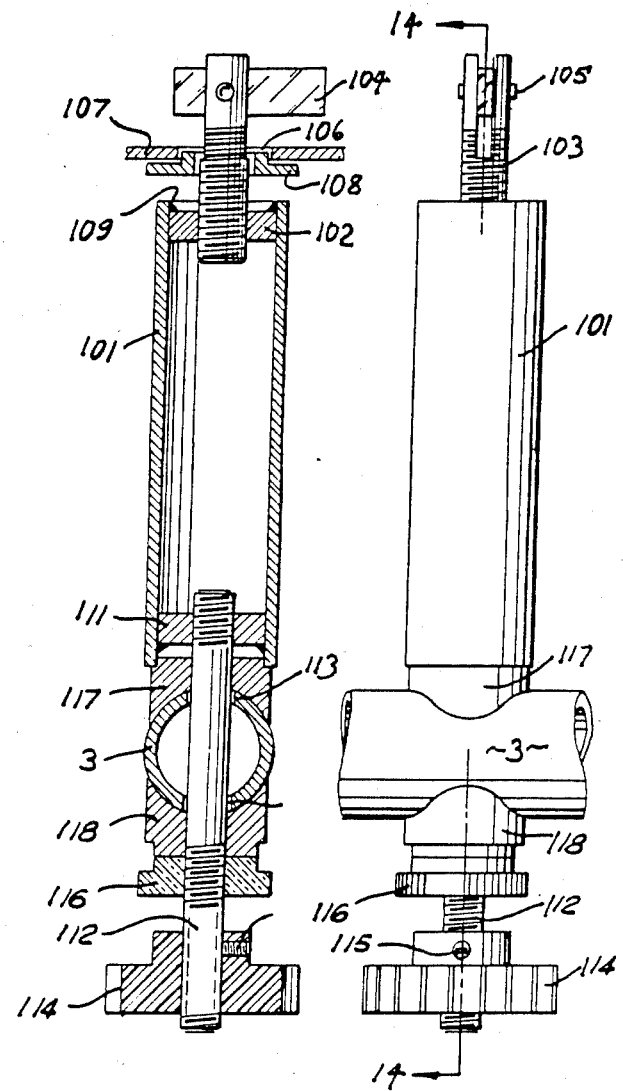
FIG. 13 is a front elevation of an alternative attachment device according to the invention.
FIG. 14 is a section taken on line 14—14 of FIG. 13.
Figure 15:
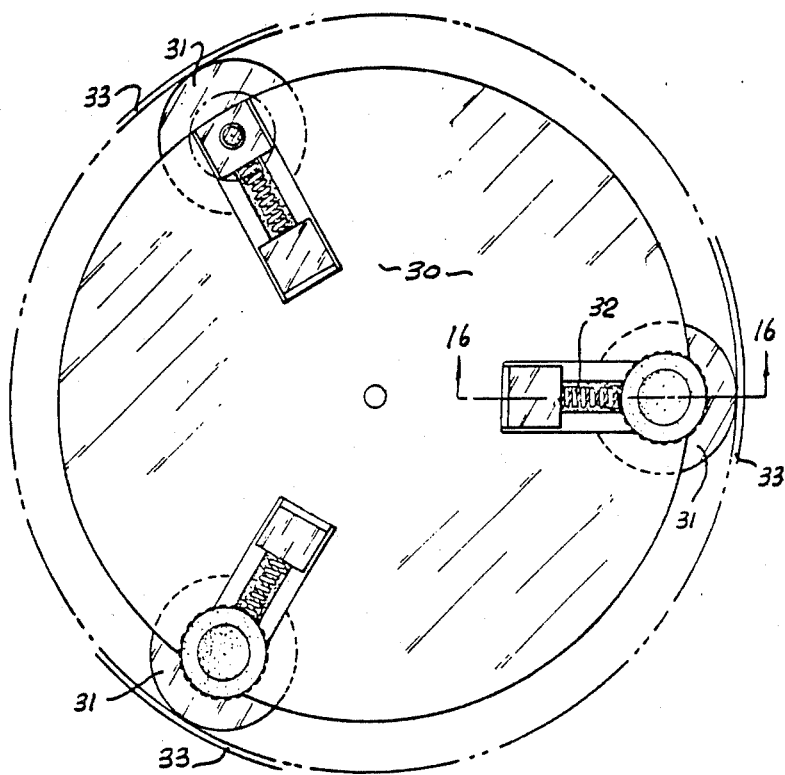
FIG. 15 is an enlarged side elevation of a wheel disc attachment according to the invention.
Figure 16:
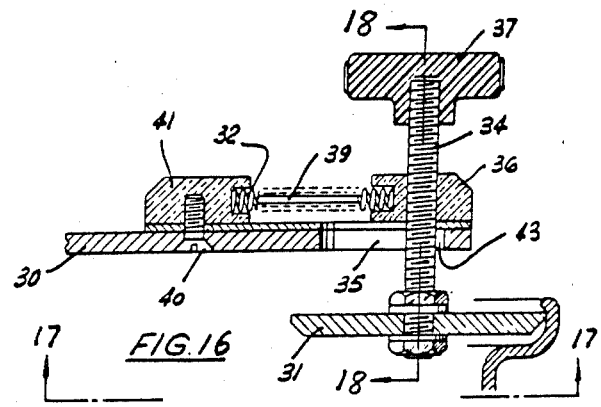
FIG. 16 is an enlarged section taken on line 16—16 of FIG. 15.
Figure 17:
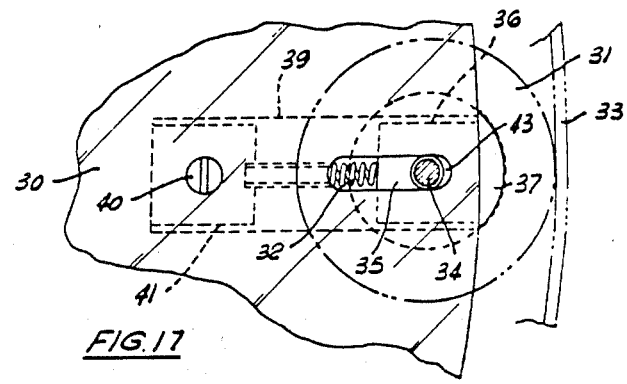
FIG. 17 is a view taken on line 17—17 of FIG. 16.
Figure 18:
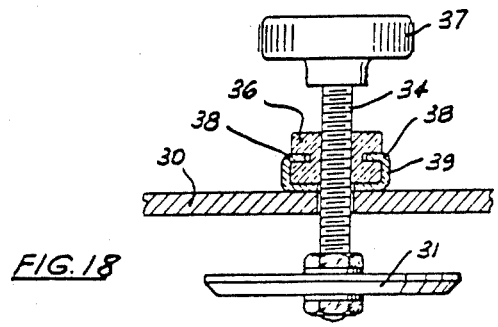
FIG. 18 is a section taken on line 18—18 of FIG. 16.

In an alternative arrangement, shown in FIGS. 13 and 14, attachment is provided by an attachment device including a rotatable sleeve 101 fixedly provided at its upper end with a nut 102. Threaded into the nut 102 is a partly split post 103 which supports a rotable anchor bar 104 by means of a transverse pin 105.

With the anchor bar rotated into a position of axial alignment with the post 103, the post can be inserted into a downwardly directed hole 106 provided in chassis member 107. If required, a stepped washer 108 can be initially sleeved over the post for engagement with hole 106 as shown.

Once the post and anchor bar have been inserted into the hole 106, the anchor bar is allowed to move into its illustrated transverse position to provide an anchorage for the attachment device. Rotation of the sleeve 101, together with its captive nut 102 then draws the anchor bar into tight fixing engagement with the chassis frame member 107 as the upper end 109 of the sleeve comes into tight engagement with the washer 108 or underside of the chassis frame 107 as required.

In order to provide support for the transverse bar 3 as well as to permit ease of rotation of the sleeve 101, the lower end 111 of the sleeve is locked to a threaded spindle 112 which extends through the transverse bar 3 by means of aligned holes 113. The spindle 112 is stated by a knob 114, threaded to the spindle and locked by a grub screw 115. A lock nut 116 is threaded to the spindle 112 for clamping the transverse beam 3 rigidly to the sleeve 101 between spacer elements 117 and 118. The upper spacer 117 may be fixedly secured to the sleeve 101 if required.

In operation, the transverse bar is provided with two attachment devices as described above, positioned in pre-selected holes 113 spaced along the bar. The respective posts and anchorage bars are inserted in appropriate holes 106 in the chassis frame and the sleeves 101 rotated by means of the knobs 114 until the sleeves are securely locked to the chassis. Each lock nut 116 is then tightened to fix the transverse bar securely to the sleeve 101 and the apparatus is available for use.

In one preferred form the knob 114 may be loosely threaded on the spindle and locked to it by means of the lock nut 116 when rotation of the sleeve 101 is required. This arrangement permits the knob and lock nut to be removed entirely from the spindle to permit the transverse bar to be removed from or presented to the spindle when the sleeve is fixed in position on the chassis frame. This arrangement also facilitates re-positioning of the spindle in alternative holes along the transverse bar to suit different spacings of attachment holes 106.

Although the invention has been described with reference to a specific example, it will be appreciated by those skilled in the art that the invention may be embodied in many other forms.

The opposite ends of the bar 3 are each provided with location marks 17 for accurately positioning a support block 18 which is slidably engageable with the bar and which may be locked in position by a bolt 19. The block 18 supports an arm 20 which extends parallel with the vehicle to a position adjacent the rear wheel 21. The arm in turn supports a rectangular conforming bar 22 provided with parallel edges 23 and 24. The conforming bar 22 is rotatably mounted to the arm 20 at pivot point 25 to permit the straight edges to be aligned with the appropriate rear wheel and a pointer 26 is provided on the arm to indicate the relative angular position of the gauge on end scales 27. This reading is then respresentative of the alignment of the wheel. The arm 20 can then be repositioned on the opposite side of the vehicle to measure the other wheel. A longitudinal scale 28 is provided along each parallel edge to accurately locate the wheel centre. The gauge may be applied directly to the wheel or the wheel may be replaced with a suitable jig plate.

By comparing the respective angular readings from the gauge for each wheel and checking the position of the wheel centres, the true relative positions and alignment of the wheels can be determined and corrected if necessary, by reference to the gauge.

In most cases sufficiently accurate measurements can be obtained by presenting the conforming bar 22 to the wheel and tire of the vehicle. However, greater accuracy is required if the wheel or tire has been distorted it is preferable to use a convenient gauge element such as a wheel disc attachment as illustrated in FIGS. 15 to 18.

The preferred form of wheel disc includes a circular perspex disc 30 provided with three locating discs 31, each resiliently biased outwardly by compression spring 32 for engagement with the adjacent wheel rim 33. Each locating disc 31 is attached to an adjusting screw 34 which passes through a slot 35 in the disc 30 and is threadably engaged with a slidable support block 36 so as to be rotatable and slidable by means of an adjusting knob 37 attached to the adjusting screw 34. The slidable support block 36 is captively engaged by inwardly directed flanges 38 on a metal guide channel 39 secured to the disc 30 by a screw 40 which engages a correspondingly shaped fixed lock 41 also captively engaged by the guide channel 39. The compression spring 32 extends between oppositely directed locating holes 42 in the fixed and slidable blocks and urges the adjusting screw 34 against the outer end 43 of the slot 35 when the locating disc 31 is not engaged with the wheel rim 33.

Figure 19:
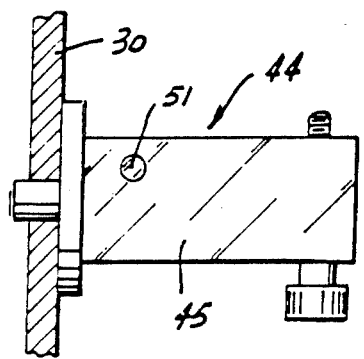
FIG. 19 is a side elevation of a spirit level gauge applied to the wheel disc attachment.
Figure 20:
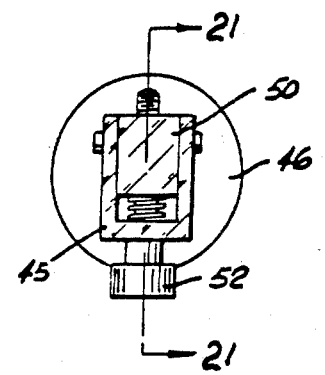
FIG. 20 is an end elevation of the spirit level gauge shown in FIG. 19.
Figure 21:
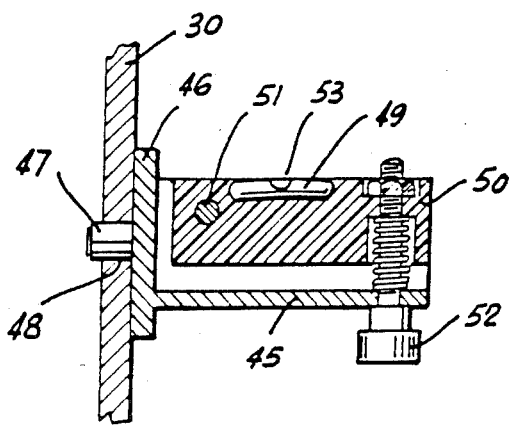
FIG. 21 is a section taken on line 21—21 of FIG. 20.

In operation, two of the locating discs are presented to the wheel rim 33 and the third disc is then slidably retracted by the adjusting knob 37 and released into engagement with the rim. The three adjusting knobs 37 can then be rotated until the disc 30 is accurately adjusted to lie in a plane normal to the axis of rotation of the wheel. This operation is facilitated by a spirit level gauge 44 illustrate in FIGS. 19 to 21. The gauge includes a body 45 in the form of a U-shaped channel having a flat surfaced end wall 46 from which a pin 47 extends for close fitting rotational engagement with a hole 48 formed in the disc 30. A spirit level 49 is mounted in a movable block 50 which is hingedly connected to the body 45 by a pin 51 and spring biased adjusting screw 52. A graduated scale is provided along the upper surface 53 of the gauge block 50.

When the disc is in position on the vehicle wheel, the wheel can be rotated until one of the locating discs is in an arbitary vertical position. The gauge is then applied to the disc and adjusted by means of the screw 52 until the spirit level bubble is zeroed against its adjacent scale. The wheel is then rotated to bring each of the remaining two locating discs into the same arbitrary vertical position and the respective adjusting knobs are rotated to bring the bubble back to its zero position. Once this position has been established for all three rotating disc assemblies, the gauge is removed and the alignment of the wheel can be checked by applying the rectangular alignment gauge 22 to the perspex disc 30.

Although the invention has been described with reference to specific examples, it will be appreciated that the invention may be embodied in many other forms.

I claim:

1. An automotive gauge apparatus for rear wheel alignment comprising:
   an elongate datum bar;
   attachment means for securing and horizontally positoning said datum bar to the underneath of a vehicle perpendicular to the desired direction of foreward moton of the vehicle, said attachment means including a pair of hangers, each having a banjo portion adapted to selectively clampingly secure said datum bar, and an attachment portion adapted to engage a formation on the underneath of the vehicle, the attachment portion including a yoke and a mating portion rotatably supported therein, the mating portion designed to rigidly engage the formation on the underneath of the vehicle;
   wheel conforming means defining a horizontal line perpendicular to the axis of rotation of a rear wheel; and
   measuring means sensing the angular displacement between said elongate datum bar and said wheel conforming means.

2. An automotive gauge apparatus according to claim 1 wherein the mating portion of said attachment portion of each hanger comprises a spool rotatably supported in the yoke, having at opposite ends thereof socket locating lugs projecting from said spool to engage a polyanged socket, such that pair of hangers are adapted to slid along said datum bar until said sockets engulf a pair of horizontally, oppositely directed fastener heads.

3. An automotive gauge apparatus according to claim 1 wherein said mating portion comprises a gripping device designed to fasten upon a formation on the underneath of a vehicle.

4. An automotive gauge apparatus according to claim 3 wherein said gripping device comprises a body including a keying surface and an upstanding boss having a bore parallel to said keying surface, a clamping screw, the respective opposite ends of which are threaded one in right hand and the other in left hand sense, captively located for rotation within said bore, a pair of opposingly directed jaws threadedly engaged with respective opposite ends of said clamping screw, each said jaw having a sliding surface adapted to interact with said keying surface to prevent rotation about said clamping screw, said gripping device being adapted to operate to grip a nut, a bolt or other projection beneath said vehicle upon rotation of said clamping screw.

5. An automotive gauge apparatus according to claim 4 wherein said clamping screw includes an engagement formation to receive a torque imparting tool.

6. An automotive gauge apparatus according to claim 5 wherein said measuring means comprises an arm adapted to extend between said datum bar and said conforming means and including means for ascertaining the angular displacement between said datum bar and said conforming means.

7. An automotive gauge apparatus according to claim 6 wherein said arm is adapted to project at a predetermined angle from said datum bar, past said wheel and wherein said conforming means is mounted for rotation to said arm about a vertical axis, said arm and said conforming means being marked with indicia, for indicating angular displacement therebetween and thus angular displacement between said conforming bar and said datum bar.

8. An automotive gauge apparatus according to claim 1 including a gauge element comprising a planar element having a planar surface, and means for attaching said planar element such that said planar surface is locatable coincident with a plane normal to the axis of rotation of said wheel, said gauge element being adapted to receive said conforming means.

9. An automotive gauge apparatus according to claim 1 wherein said attachment means comprises a threaded post having a split in one end thereof, an anchor bar supported centrally for rotation upon a pin extending across said split, a lock not threadedly engaged with said post, the other end of said post being adapted to be connected with said datum bar, said attachment means being adapted to project through a downwardly directed hole in the underside of a vehicle with the anchor bar disposed in line with said post and by subsequent rotation of said anchor bar and turning of said lock nut retraction therefrom is prevented.

* * * * *